United States Patent [19]
Casey et al.

[11] Patent Number: 5,381,646
[45] Date of Patent: Jan. 17, 1995

[54] SEED ROW CROP HARVESTER WITH VACUUM SCATTERED SEED SAVER

[76] Inventors: Omer L. Casey; Gordon G. Casey, both of Rte. 1 Box 55M 15th St. & Ave. C., Somerton, Ariz. 85350-9749; Larry L. Casey, 2843 11th Pl., Yuma, Ariz. 85364

[21] Appl. No.: 181,223

[22] Filed: Jan. 13, 1994

[51] Int. Cl.⁶ ............... A01D 45/30; A01D 41/06; A01D 41/10
[52] U.S. Cl. ............... 56/13.1; 56/13.5; 56/15.8; 56/DIG. 8
[58] Field of Search ............... 56/13.1, 12.9, 13.2, 56/126, 128, DIG. 8, 13.5, 15.8

[56] References Cited

U.S. PATENT DOCUMENTS

| | | | |
|---|---|---|---|
| 2,518,465 | 8/1950 | Hagen et al. | 56/13.1 |
| 2,538,454 | 1/1951 | Hart, Jr. | 56/13.1 X |
| 2,827,749 | 3/1958 | Patten | 56/128 |
| 3,961,465 | 6/1976 | Winings | 56/13.1 |
| 4,035,993 | 7/1977 | Bell et al. | 56/13.1 |
| 4,730,444 | 3/1988 | Leffel et al. | 56/13.1 |
| 4,815,261 | 3/1989 | Anderson | 56/13.1 X |
| 5,134,837 | 8/1992 | Casey et al. | 56/12.8 |
| 5,197,266 | 3/1993 | Kambeitz | 56/13.1 |

Primary Examiner—Stephen J. Novosad
Attorney, Agent, or Firm—Jacobson, Price, Holman & Stern

[57] ABSTRACT

A windrowed crop harvester of the type including a tined pickup drum and a transverse, center discharge auger is modified to include opposite side seed pickup vacuum heads for disposition within the outer furrows of a three furrow swath along which the harvester is being moved with the vacuum heads being operative to vacuum up any seeds disposed within the aforementioned outer furrows. Also, the harvester includes a center vacuum head downwardly receivable within the center furrow of a three furrow swath and operative to vacuum up seeds from the center furrow and to transfer those vacuumed seeds into the interior of the harvester.

9 Claims, 3 Drawing Sheets 5,381,646

SEED ROW CROP HARVESTER WITH VACUUM SCATTERED SEED SAVER

BACKGROUND OF THE INVENTION

1. Field of the Invention

A crop harvester incorporating a tined pickup drum and a transverse center discharge auger for picking up valuable cut and dried windrowed seed crops. The crop harvester typically incorporates a "John Deere 7700" harvester which is operative to pick up four adjacent rows of seed crop which have been windrowed into a single windrow centered relative to the two middle rows of a four row swath.

When a cut and dried windrow of seed crops is mechanically picked up by a harvester, a reasonable percentage of the total seed content of the windrow fly into the air and back down upon the ground within the center furrow and the previous windrowing operation is not fully effective in windrowing all of the seed crop cut in a four row swath into a windrow overlying only the center two rows and the center furrow therebetween with the result that some of the seed crop remains in the bottom of the furrows disposed immediately adjacent and on either side of the center furrow.

Accordingly, an appreciable percentage of the total seed content in the four row swath of seed crops windrowed into a windrow over the center two rows of the swath lie within the center furrow and the two immediately adjacent furrows on opposite sides of the center furrow, the harvester including front wheels which track in the furrows immediately adjacent and on opposite sides of the center furrow.

In the past, in order to prevent the loss of the seeds or seed pods lying within the furrows, some farmers that grow onions as a seed crop utilized plastic sheeting upon which to place the seed crop upon initial cutting and to thereafter use more expensive methods of harvesting. Although this method reduces the seed loss, it raises additional problems including increased work hours to harvest the crop, the additional cost of plastic sheeting, the problem of transporting new plastic sheeting to the field as well as transport and disposal of the old plastic sheeting and further requires more constant attention during a harvesting operation.

Although the problem of seed crop loss has also been attacked by various methods such as the utilization of high velocity air streams along the underside and above the upperside of a windrow being picked up, even these dramatic attempts at preventing seed loss do not specifically address the loss of those seeds which fall to the bottom of the three furrows beneath and on opposite sides of a windrowed seed crop being picked up.

The harvester of the instant invention incorporates downwardly and oppositely laterally opening vacuum heads each floatingly supported within a corresponding furrow along which the harvester is being moved and at a minimum height above the bottom of the corresponding furrow, the vacuum heads comprising critical components of a vacuum pickup assembly operative to vacuum seeds from within the furrows and to convey the seeds substantially directly into the feeder house of the harvester which receives the remainder of the windrowed seed crop from the pickup roller and auger of the harvester.

DESCRIPTION OF THE PRIOR ART

Various different forms of crop pick up devices including some of the general, structural and operational features of the instant invention heretofore have been provided. Examples of these previously known structures or devices are disclosed in U.S. Pat. Nos. 2,518,465, 2,538,454, 2,827,749, 3,961,465, 4,035,993, 4,730,444, 5,134,837 and 5,197,266.

However, these previously known devices do not include the specific floating vacuum head assemblies of the instant invention which are operative to vacuum seeds from the center three furrows and to convey and deposit the vacuumed seeds substantially directly into the feeder house of the harvester.

SUMMARY OF THE INVENTION

The main object of this invention is to provide a seed harvester, such as that utilized in harvesting onion seeds, which will substantially reduce the loss of seeds which fall into the furrows between crop rows over which multiple rows of crops have been cut and windrowed for drying purposes before harvesting.

Another object of this invention is to provide a modification to a conventional seed crop harvester which may function in accordance with usual operation of the harvester and which may be added to an associated harvester at a minimum of expense.

Still another important object of this invention is to provide a seed harvester modification which, at present day onion seed prices, results in an increase in efficiency of seed harvesting resulting in a savings of between $300.00 and $400.00 per acre, the usual gross sale of an acre of onion seeds harvested at todays prices amounting to approximately $7,000.00.

Another very important object of this invention is to provide a seed crop harvester modification in accordance with the preceding objects and which does not alter the basic operation of the harvester.

A further object of this invention is to provide a seed crop harvester modification which will actually improve the ambient atmosphere adjacent the harvester by reducing the amount of airborne dust created during the harvesting operation.

Still another object of this invention is to provide a harvester modification in accordance with the preceding objects whose operation is substantially totally independent of the usual operation of the attendant harvester so as to not void any manufacturers' warranty covering the harvester.

A still further object of this invention is to provide a seed crop harvester with vacuum pickup heads which open downwardly and laterally outwardly to opposite sides and which may be mounted upon an existing seed crop harvester in a floating manner with the vacuum heads spaced a predetermined distance above the bottom of the furrows in which they travel so as to be operative to vacuum up substantially all stray seeds and seed pods which may lie in the furrows.

A final object of this invention to be specifically enumerated herein is to provide a seed crop harvester modification in accordance with the preceding objects and which will conform to conventional forms of manufacture, be of simple construction and easy to use so as to provide a modification which will be economically feasible, long lasting and relatively trouble free in operation.

DETAILED DESCRIPTION OF THE INVENTION

Figure 1:
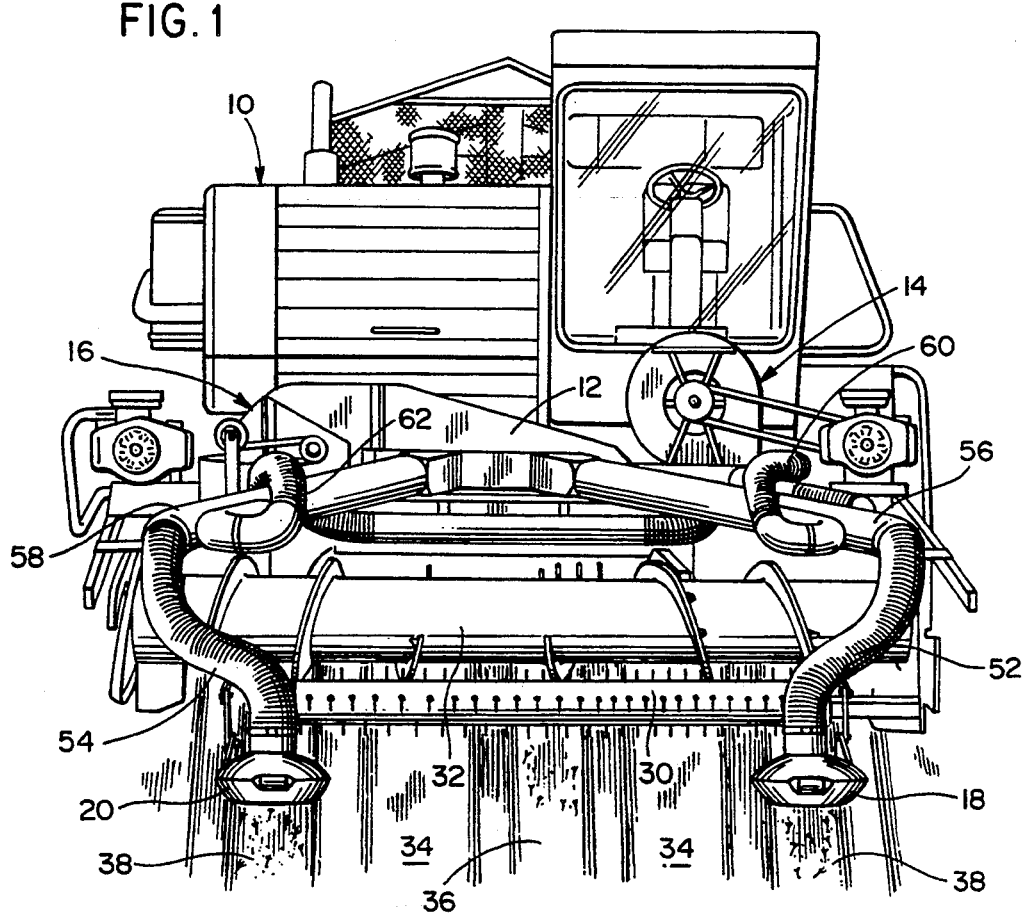
FIG. 1 is a front perspective view of a typical seed crop harvester which has been modified in accordance with the present invention.
Figure 2:
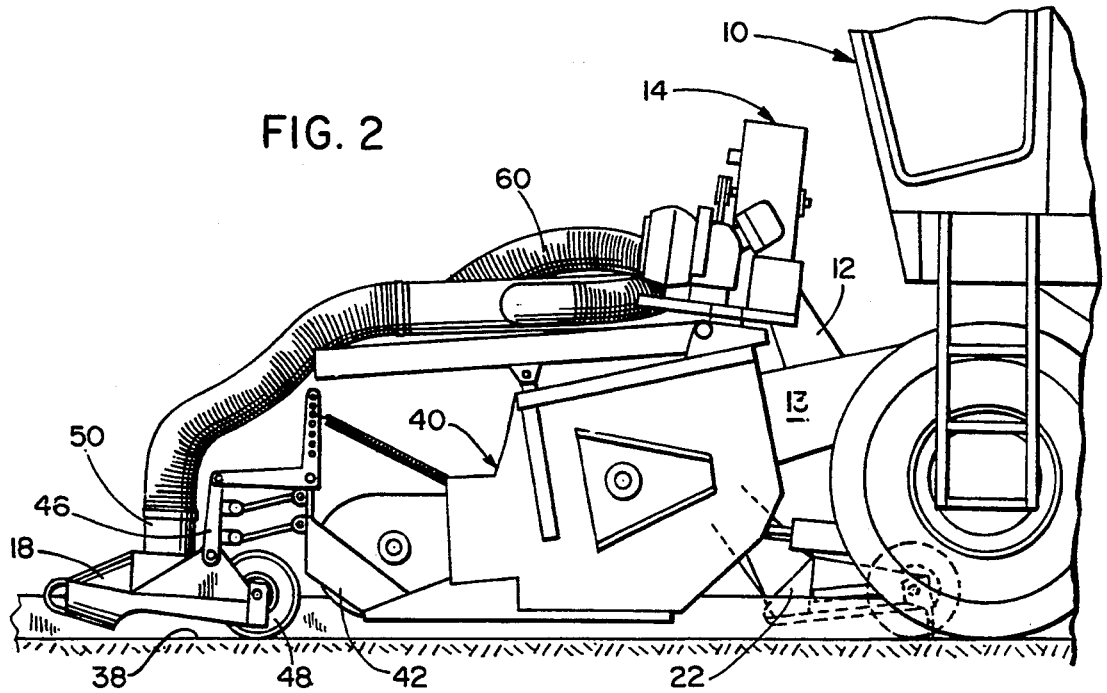
FIG. 2 is a fragmentary side elevational view of the vertically adjustable harvester head in a lowered operative position and as seen from the left side thereof.

Referring now more specifically to the drawings the numeral 10 generally designates a grain combine of the instant invention. The combine 10 may be of any suitable type such as the "John Deere 7700" which is widely used for harvesting seed crops. The combine is substantially conventional in design except for the addition of a downwardly opening air box 12 which opens downwardly into the feeder house 13 of the harvester 10 and also the addition of two motor driven blower assemblies 14 and 16, three vacuum pickup heads 18, 20 and 22 and three duct assemblies including two duct assemblies referred to in general by the reference numerals 24 and 26 communicating the blower assembly 14 with the heads 18 and 20 as well as the air box 12 and a third duct assembly 28 communicating the head 22 with the blower assembly 16 and the blower assembly 16 with the air box 12.

The harvester 10 includes the usual pickup drum 30 and centering auger 32 for picking up a windrowed seed crop and discharging the crop into the forward end of the feeder house 13 for conveying rearwardly therethrough toward the threshing cylinder (not shown) within the harvester 10.

The harvester 10, when in operation, straddles a pair of crop rows 34 between which a center furrow 36 is disposed and laterally outwardly of which a pair of outside furrows 38 are disposed. The harvester 10 includes opposite side front wheels 40 which track in the furrows 38 as well as rear wheels (not shown).

Before the harvester 10 is utilized in harvesting a seed crop such as onion seeds, four rows of onions are cut (by hand or machinery) and windrowed (by hand or machinery) over the rows 34 and the center furrow 36 although some of the cut crop will fall into the outside windrows 38. The crop is then allowed to dry before being harvested by the harvester 10.

During the harvesting operation any seeds or seed pods lying within the outside windrows 38 are conventionally missed by the harvester 10 and an appreciable portion of the seed crop windrowed over the center furrow 36 is also missed.

In comparing the total seed harvested by a conventional harvester such as the harvester 10 and a harvester modified in accordance with the present invention, it has been found that the modified harvester is capable of harvesting in the neighborhood of 4% to 5% more seeds. Furthermore, the modification of the harvester 10 in accordance with the present invention is relatively inexpensive and certainly no more expensive than a one years expense in an attempt to harvest a maximum percentage of the crop through the utilization of plastic sheeting, depending upon the acreage of the crop to be harvested.

The air box 12, feeder house 13, pickup drum or roller 30 and auger 32 all comprise parts of the pivotally mounted, height adjustable head referred to in general by the reference numeral 40 and including a frame 42 from which the pickup drum and augur 32 are journaled.

Forward opposite side portions of the frame 42 floatingly support the vacuum pickup heads 18 and 20 therefrom, each by a parallelogram linkage 42 and an adjustably spring biased bell crank 44 pivotally supported from the corresponding side of the frame 42 and connected to the associated head 18, 20 through a connecting link 46 pivotally attached at its opposite ends to one end of the bell crank 44 and the corresponding head 18, 20.

The heads 18 and 20 open downwardly and laterally outwardly to opposite sides thereof and each includes a journaled rear wheel 48 which maintains the forward underside portion of the corresponding head two inches above the underlying ground surface. The heads 18, 20 are hollow and include upwardly opening air outlets 50 to which the inlet ends of a pair of vacuum hoses 52 and 54 are sealingly connected, the outlet ends of the hoses 52 and 54 being connected and sealed relative to the inlet ends of a pair of eductor tubes 56 and 58 and the outlet ends of the eductor tubes 56 and 58 opening into the air box 12 which in turn opens downwardly into the interior of the feeder house 13.

In addition, in order to effect a vacuum at the vacuum heads 18, 20, the motor driven blower assembly 14 includes a pair of pressurized air discharge conduits 60 and 62 also comprising parts of the duct assemblies 24 and 26. The outlet ends of the pressurized air discharge conduits 60 and 62 open into the inlet ends of the eductor tubes 56 and 58 in an upstream direction, whereby the discharge of pressurized air from the discharge conduits 60 and 62 into the inlet end portions of the eductor tubes 56 and 58 will effect a high vacuum in the vacuum hoses 52 and 54.

From FIG. 1 of the drawings it may be seen that the cross sectional shape of the lower portions of the heads 18 and 20 is such that the downwardly and laterally outwardly opening heads 18 and 20 will closely conform to the contour of the furrows 38 so as to be very effective in vacuuming onion seeds and stems having onion seeds thereon from the furrows 38.

Figure 3:
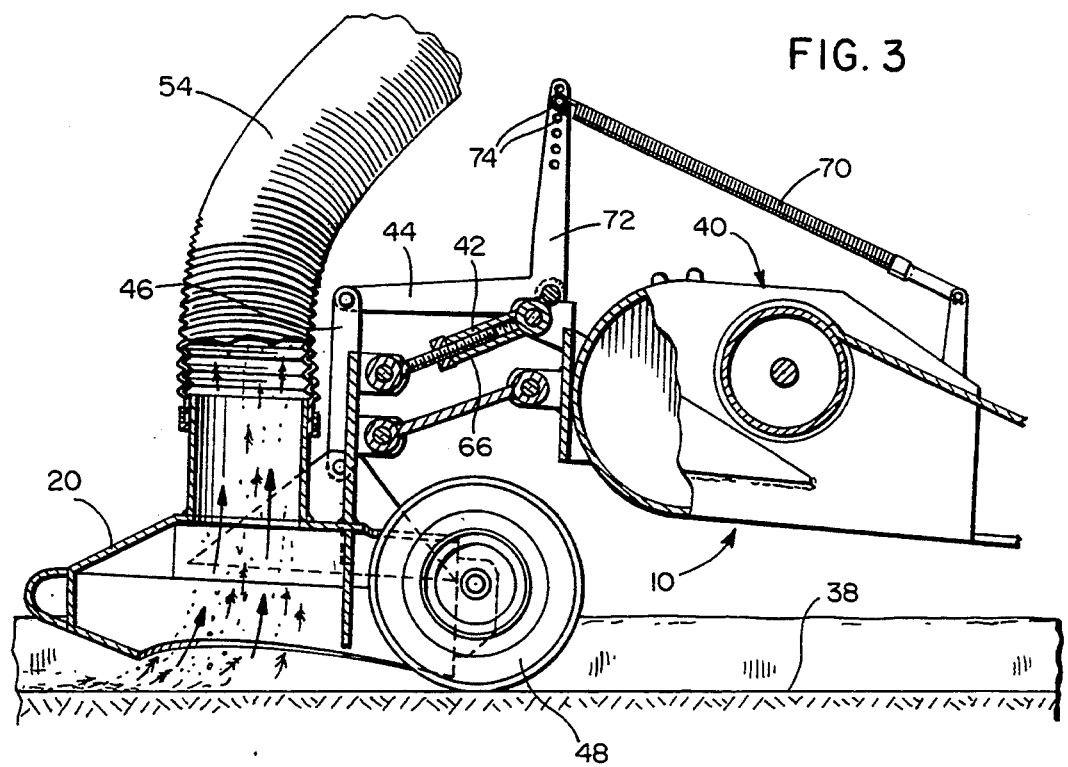
FIG. 3 is an enlarged fragmentary longitudinal vertical sectional view illustrating the manner in which one of the two opposite side vacuum heads of the instant invention is mounted from the corresponding transverse end of the harvester head in a floating manner.
Figure 4:
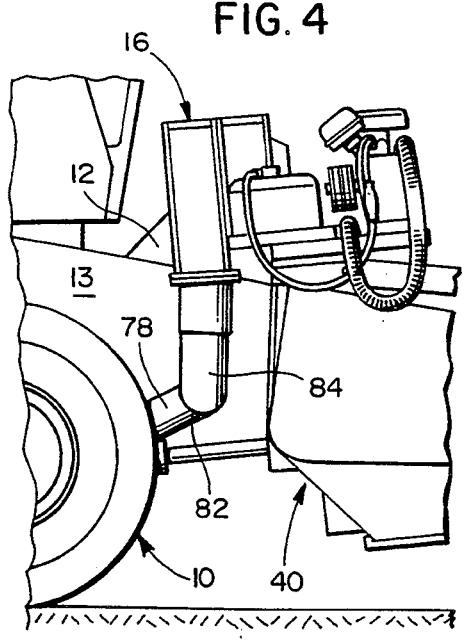
FIG. 4 is a fragmentary side elevational view of the harvester head as seen from the right side thereof and illustrating the motor driven blower assembly operatively associated with the center rear vacuum head.

From FIG. 3 of the drawings it may be seen that the parallelogram linkages 42 includes upper link means 66 which are adjustable in length, thereby enabling height adjustment of the forward portions of the heads 18 and 20 relative to the bottom of the furrows 38 in relation to the wheels 48 which contact the bottom of the furrows. Further, each bell crank 44 is under the biasing action of an expansion spring 70 which may be adjustably anchored to longitudinally spaced portions of the upstanding arm 72 of the corresponding bell crank 44 as at 74. The weight of each head 18, 20 and the adjacent end of the corresponding vacuum hose 52, 54 is substantially counterbalanced by the biasing action of the corresponding spring 70 on the upstanding arm 72 of the associated bell crank 44.

Figure 5:
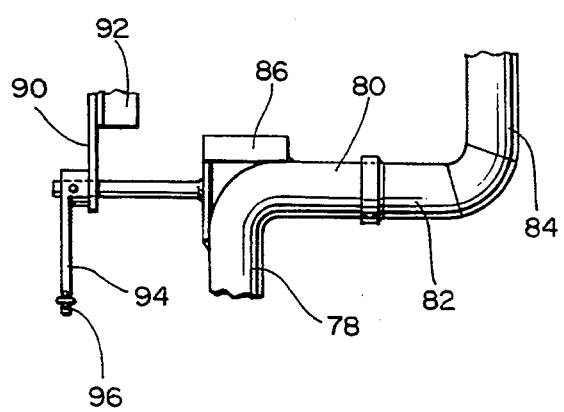
FIG. 5 is a fragmentary enlarged elevational view illustrating the manner in which the rearwardly and downwardly inclined inlet end of the duct assembly for the center rear vacuum head is pivotally mounted from the vertically adjustable head of the associated harvester.
Figure 6:
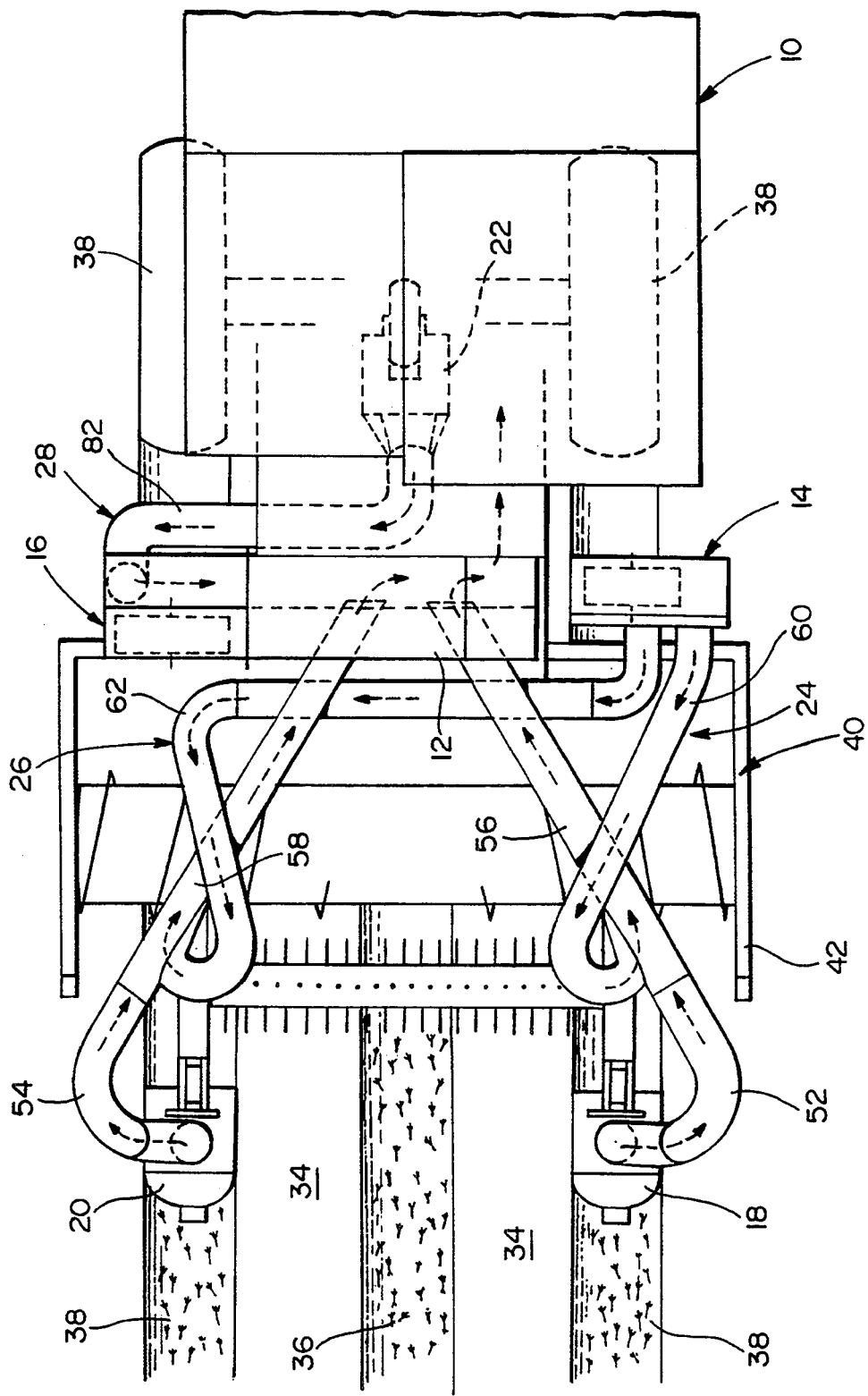
FIG. 6 is a top schematic view of the harvester illustrating the passage of air through the various duct work components of the instant invention.

The center vacuum head 22 is carried by the lower end of a rearwardly and downwardly inclined vacuum tube 78 including a laterally directed upper outlet end 80. The lower end of the vacuum tube 78 opens downwardly into the interior of the vacuum head 22, the latter being constructed in a similar manner to the vacuum heads 18, 20, and the outlet end 80 is rotatably received within the inlet end 82 of a stationarily mounted inlet pipe 84 whose outlet end opens into and comprises the inlet for the motor driven blower assembly 16. The vacuum tube 78 and inlet pipe 84 comprise portions of the duct assembly 28 and the outlet end 70 further has a bracket 86 and stub shaft portion 88 (see FIG. 5) supported therefrom with the stub shaft portion 88 being rotatably received through a bracket 90 supported from the frame 92 of the harvester 10. The free end of the stub shaft portion 88 includes a lever arm mounted thereon to whose free end one end of a link chain 96 is attached, the other end of the link chain 96 being attached to the frame 92 in a manner such that raising of the head 40 above a slightly raised position will automatically cause the lower end of the vacuum tube 78 and the vacuum head 22 supported therefrom to swing rearwardly and upwardly with respect to the feeder house 13. Furthermore, another link chain (not shown) is operatively connected between the feeder house 13 and the vacuum tube 78 or vacuum head 22 in order to limit downward swinging movement of the head 22 relative to the feeder house 13.

The inlet pipe 84 opens into the blower assembly 16 and any onion seeds or the like and stalks disposed within the center furrow 36 are vacuumed up into the head 22, through vacuum tube 78 and the inlet pipe 84 for discharging into the housing of the blower assembly 16. The vacuumed material then passes through the blower assembly 16 and is discharged into the air box 12 and subsequently downwardly into the feeder house 13.

While the pickup drum 30 and auger 32 are operative to pick up and convey a substantial portion of windrowed seed crop against which the harvester 10 is advanced, the heads 18, 20 and 22 perform an extremely important function of vacuuming loose seeds and seed pods as well as stems having seeds or seed pods thereon from the furrows 36 and 38. In is believed readily apparent that the pickup drum 30 and augur 32 are not operative to pick up such material from the windrows 36 and 38. Accordingly, 5% greater crop yield is achieved through utilization of the vacuum heads 18, 20 and 22 of the instant invention. Of course, when this much yield increase is achieved with substantially the same mechanical operating and operator's cost, profit margins are more dramatically increased.

The foregoing is considered as illustrative only of the principles of the invention. Further, since numerous modifications and changes readily will occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a grain combine for harvesting cut, dried and windrowed seed crops and wherein the seed crop to be harvested has been centrally windrowed between the remote marginal portions of the outer furrows of at least a three row furrow swath, said combine including forward opposite side support wheels for tracking in said outer furrows and a forward adjustable height harvesting head for picking up the windrowed seed crop and feeding the picked up crop to the interior of said combine, a vacuum pick up assembly for random seeds and seed pods remaining in said outer furrows, said assembly including a pair of opposite side, downwardly opening vacuum heads mounted from said harvesting head and disposed forward of said support wheels in front-to-rear alignment therewith, and combined vacuum producing duct means operative to produce a vacuum at said vacuum heads and convey random seeds vacuumed from said outer furrows into said vacuum heads from the latter into the interior of said combine.

2. The combination of claim 1 including support means floatingly supporting said vacuum heads from said harvesting head for limited vertical shifting relative thereto.

3. The combination of claim 1 wherein said combined vacuum producing and duct means includes duct structure having inlet and outlet ends opening into said heads and the interior of said harvester, respectively, and pressurized air supply means operative to discharge air under pressure into said duct structure, intermediate the opposite ends thereof, in a downstream direction toward the interior of said harvester and thereby create a vacuum in the upstream portion of said duct structure and said vacuum heads by eduction.

4. The combination of claim 1 wherein said vacuum pickup assembly includes central vacuum head means for each furrow of said swath disposed between said outer furrows and centrally supported from said head and combined vacuum producing and duct means operative to produce a vacuum at said central head means and convey random seeds vacuumed from each furrow between said outer furrows into said central vacuum head means and thereafter convey said seeds into the interior of said combine.

5. The combination of claim 1 wherein said central vacuum head means consists of a single central vacuum head means centrally spaced between said support wheels.

6. The combination of claim 4 wherein said central vacuum head means includes ground engageable wheel means journaled therefrom operative to maintain said central vacuum head means slightly spaced a predetermined distance above the bottom of a central furrow disposed centrally between said support wheels.

7. The combination of claim 1 wherein said opposite side vacuum heads each include ground engageable wheel means operative to maintain said vacuum heads slightly spaced a predetermined distance above the bottom of said outer furrows.

8. A method of preventing loss of loose seeds or seed pods in a crop windrow between the remote marginal portions of the outer furrows of at least a three furrow swath, said method comprising:

a) providing a crop windrow pickup mechanism attached to a harvesting machine, the pickup machine including a rotary tined pickup drum for lifting a windrow and an auger assembly for receiving lifted windrow material as the harvesting machine moves forward against a windrow;

b) rotating the pickup drum so that its tines lift the windrow upward and over the pickup drum and into the auger assembly while the harvesting machine moves forward;

c) supporting downwardly opening vacuum heads from opposite sides of the crop pickup mechanism with the heads registered with and disposed in the outer furrows of at least a three row furrow swath along which the harvesting machine is being moved forwardly;

d) applying a vacuum to said heads to thereby vacuum seeds within said furrows up into said heads; and e) conveying the vacuumed up seeds into the interior of the harvesting machine.

9. The method of claim 8 including mounting a center vacuum pickup head from said crop pickup mechanism positioned within the center furrow of said three furrow swath;

f) effecting a vacuum within said center head in order to vacuum seeds from said center furrow into said center head; and g) conveying the seeds vacuumed into said center head from the latter and into the interior of said harvester.

* * * * *